Patented Dec. 10, 1929

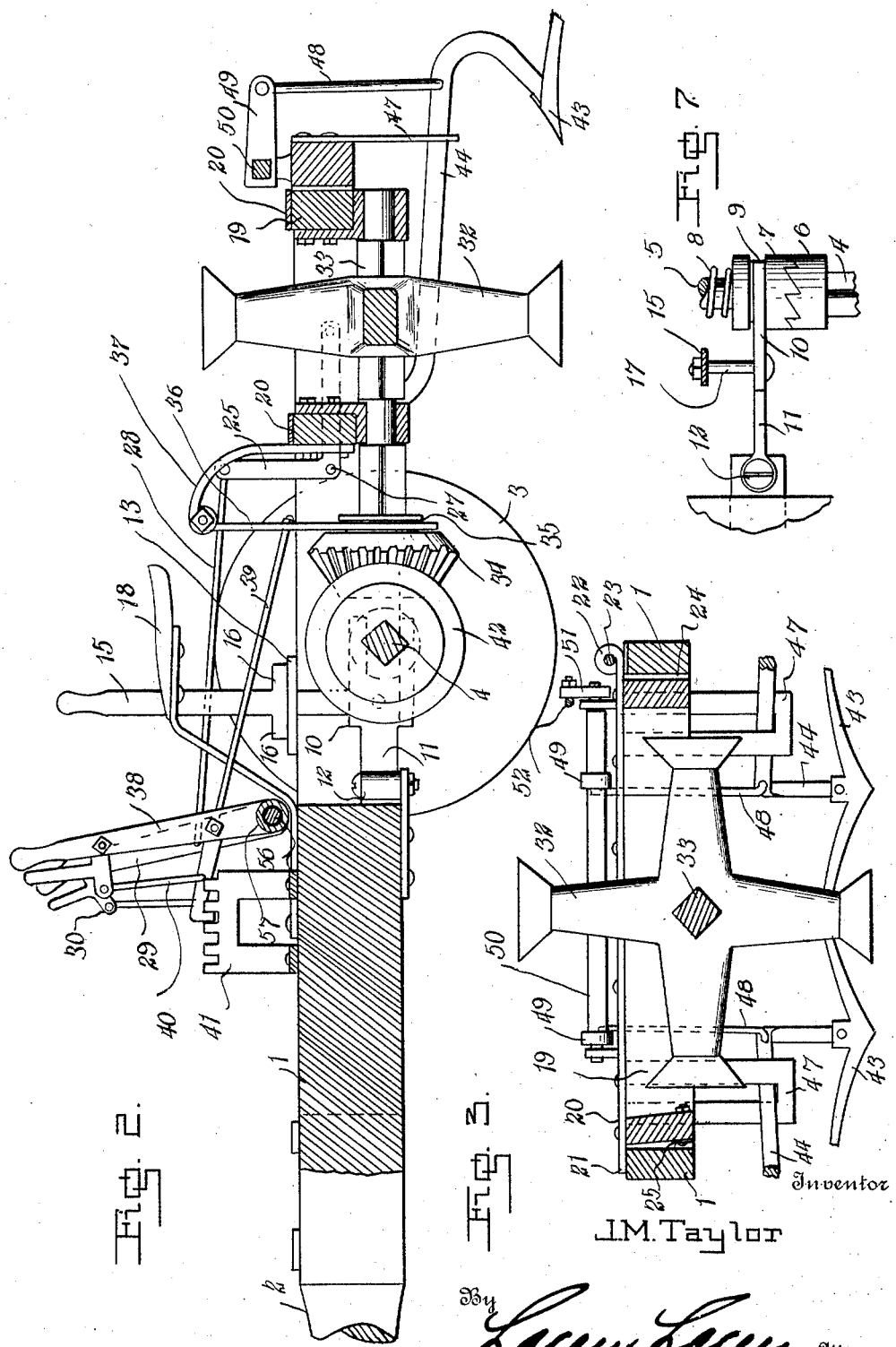

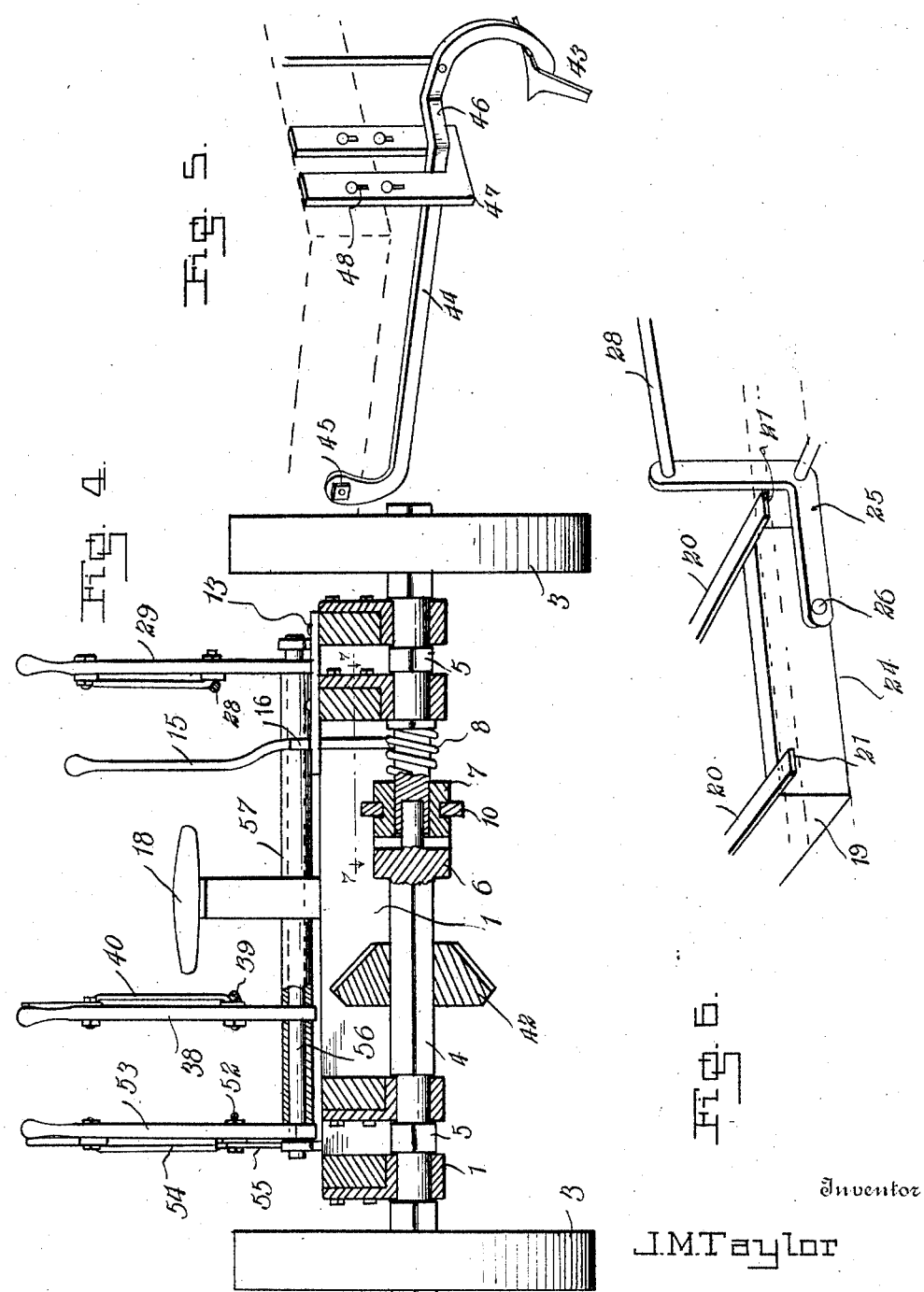

1,739,020

UNITED STATES PATENT OFFICE

JOEL M. TAYLOR, OF HAWKINSVILLE, GEORGIA

AGRICULTURAL MACHINE

Application filed March 7, 1928. Serial No. 259,838.

This invention relates more particularly to cotton choppers and has for its object the provision of simple and efficient means whereby the hoe or chopper may be adjusted to operate at a desired depth or held out of operative position. Another object of the invention is to provide simple means for operating the chopper and for permitting the machine to make a short turn, and a still further object of the invention is to provide means whereby cultivator blades may be adjustably mounted to run at the rear of the chopper. These stated objects, and other objects which will incidentally appear in the course of the following description, are attained in such an apparatus as is illustrated in the accompanying drawings, and the invention resides in certain novel features which will be particularly pointed out in the appended claims.

In the drawings:

Fig. 2 is a longitudinal vertical section on the line 2—2 of Fig. 1;

Fig. 3 is a transverse section through the chopper and its mounting and looking toward the rear;

Fig. 4 is a transverse section on the line 4—4 of Fig. 1;

Fig. 5 is a detail perspective view of one of the cultivators and the support for the same;

Fig. 6 is a detail view of a part of the means for adjusting the chopper, and

Fig. 7 is a detail horizontal section on the line 7—7 of Fig. 4.

Figure 1:
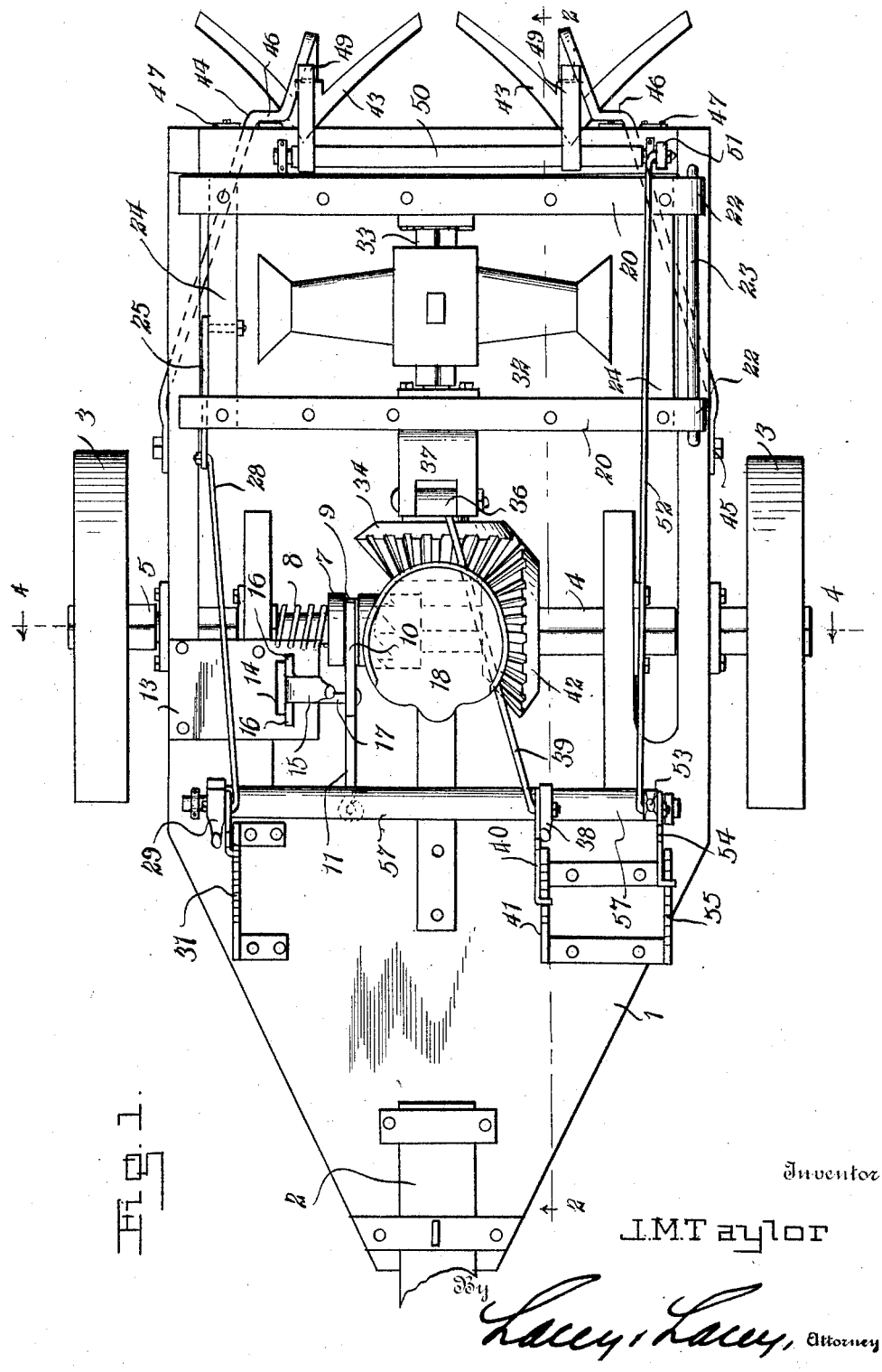
Figure 1 is a plan view of a machine embodying the invention.

In carrying out the invention, there is provided a main frame 1 having a draft pole or tongue 2 secured to its front end and supported upon ground wheels 3 which are fixed to the ends of an axle, said axle consisting of two alined members 4 and 5 journaled in suitable bearings provided therefor in the sides of the main frame and having interengaging ratchet disks or clutch members 6 and 7 secured to their respective inner ends. The clutch member or ratchet disk 6 is rigidly fixed to the inner end of the axle member 4 but the clutch member 7 has a limited sliding movement upon the axle member 5, although it is constrained to rotate therewith, and an expansion spring 8 is coiled around the axle member between the inner bearing thereof and the outer side of the clutch member so that the clutch members will be yieldably held in engagement. By this arrangement when the machine is being turned toward the right, the clutch member 6 will be permitted to ride over the clutch member 7 and thereby accommodate the difference in speeds of the two ground wheels. To disengage the clutch members when the machine is being turned to the left, the clutch member 7 is constructed with an annular groove 9 in which is engaged the fork 10 on the rear end of a shifting arm 11 which is pivotally mounted at its front end upon the main frame, as shown at 12. A bracket plate 13 is secured upon the main frame at the side supporting the axle member 5 and projects inwardly, its inner extremity being constructed with a slot 14 receiving a hand lever 15 which is provided with lateral lugs 16 resting upon the upper side of the plate and constituting rockers for the lever. The lower end of the lever 15 depends below the supporting plate or bracket 13 and is connected by a link 17 with the shifting arm 11, as shown most clearly in Fig. 7. It will now be readily seen that by rocking the lever 15, the clutch member 7 may be withdrawn from the clutch member 6 against the tension of the spring 8 and upon releasing the lever the spring 8 will at once expand and restore the engagement of the clutch members. The lever 15 is so located that it may be easily reached by the driver from the seat 18 which is supported in any convenient manner upon the main frame.

Disposed adjacent the rear end of the main frame is a transverse frame comprising parallel bars 19 which are disposed between the side bars of the main frame and have reinforcing and supporting straps 20 secured upon their upper edges, the ends of the straps extending beyond the ends of the bars so that they will project over the side bars of the main frame, and at one end these straps 20 constitute supports which limit the downward movement of the transverse frame and thereby prevent the chopper digging into the ground to an excessive extent, the stop ends of the bars being shown at 21. At their opposite ends, the bars 20 are formed into eyes 22 which engage around a bail or pintle 23 secured upon the main frame so that the transverse frame is hingedly supported. This transverse supplemental frame also includes end bars 24 which are disposed between the bars 19 and constitute braces to maintain the transverse bars in fixed relation, and at the free end of the supplemental frame an angle lever 25 is pivoted at one end, as shown at 26, to the adjacent end bar, the angle lever being fulcrumed at its bend upon the adjacent side of the main frame, as shown at 27, and a connecting rod 28 being pivoted to the extremity of the upstanding arm of the angle lever. The front end of the connecting rod 28 is pivoted to a hand lever 29 which is mounted upon the main frame in advance of the driver's seat and is equipped with a latch 30 arranged to cooperate with a holding rack 31 so that the lever will be held in a set position and the cotton chopper maintained to run at a desired depth or held entirely clear of the ground. The chopper comprises a cruciform body 32 rigidly secured at its center upon a longitudinal shaft 33 which is journaled in the front and rear bars of the supplemental frame and has a beveled gear 34 fitted upon its front end. Said gear is slidably mounted upon the shaft but is constrained to rotate therewith and is constructed with an annular groove 35 in which is engaged the lower end of a yoke 36 which is pivoted at its upper end to a bracket 37 secured to the front side of the transverse supplemental frame. A hand lever 38 is mounted upon the frame adjacent the front end thereof and a connecting rod 39 is pivoted to and connected with the yoke 36 and said hand lever so that any rocking movement of the hand lever will be communicated to the yoke and the gear wheel 34 consequently shifted longitudinally of the shaft 33. The hand lever 38 is equipped with a latch 40 adapted to engage a holding rack 41 so that the parts will be maintained in a set position. Secured upon the axle member 4 adjacent the inner end thereof is a beveled gear 42 which meshes with the gear 34 so that as the machine is drawn over a field along a row of plants, the chopper will be rotated and the blades carried at the outer ends of its several arms will be caused to cut through the standing plants and remove the same at regular intervals. By properly rocking the hand lever 38, the yoke 36 will be rocked so that the gear 34 will be drawn out of or put in mesh with the gear 42 and, consequently, the chopper may be held entirely out of operation or may be permitted to operate intermittently as the judgment of the driver may suggest.

Disposed to run at the rear of the frame and follow the chopper are cultivators comprising shovels 43, which are preferably of the double type illustrated, and beams 44 extending upwardly and forwardly from the shovels and pivotally secured at their front ends to the sides of the main frame, as indicated at 45. It will be observed that the beams diverge forwardly so as to extend under and across the rear corners of the main frame and intermediate their ends are formed with offsets or bends 46 which are adapted to ride upon the rear sides of sustaining brackets 47 and thereby aid in maintaining the shovels in the proper paths. The brackets 47 are substantially U-shaped plates secured to the rear end of the main frame and provided with vertically extending slots 48 through which the securing screws or bolts 49 are inserted to vertically adjust the plates in an obvious manner. The beams are limited in their downward movement by the lower ends of the plates which, consequently, form rests for the beams and the shovels are thereby prevented from entering the soil at an excessive depth which would choke the operation and unnecessarily increase the draft of the machine. Links 48 are attached at their lower ends to the respective beams 44 and at their upper ends to cranks 49 which are fixed to and extend rearwardly from a rock shaft 50 which is journaled upon the rear end of the main frame. At one end of the rock shaft 50 is secured a crank 51 to which is pivoted the rear end of a connecting rod 52 which extends forwardly and has its front end pivoted to a hand lever 53 which is mounted upon the front end of the main frame and equipped with a latch 54 adapted to cooperate with a holding rack 55 whereby the parts may be held in a set position, as will be understood.

The several hand levers 29, 38 and 53 are mounted loosely upon a fulcrum rod 56 which is secured transversely upon the frame adjacent the front end thereof, and spacing sleeves 57 are fitted about this rod between the several levers so as to maintain the properly spaced relation thereof and prevent them shifting along the road.

From the foregoing description, taken in connection with the accompanying drawings, it will be seen that I have provided a very compact, durable and efficient machine for the purposes stated.

Having thus described the invention, I claim:

1. An agricultural machine comprising a main frame, a chopper frame hingedly connected at one end to one side of the main frame and disposed transversely thereof, stops at the opposite side of the chopper frame adapted to rest upon the adjacent side of the main frame, a chopper rotatably mounted in the chopper frame, and means mounted upon the chopper frame and the main frame for rotating the chopper.

2. An agricultural machine comprising a main frame, ground wheels supporting the main frame, a chopper frame pivotally attached at one end to the side of the main frame and provided at its opposite end with stops adapted to rest upon the main frame, a chopper rotatably mounted on the chopper frame, gearing driven by the supporting wheels of the main frame for rotating the chopper, an angle lever fulcrumed upon the main frame adjacent the free end of the chopper frame and having one end pivoted to the adjacent end of the chopper frame, a hand lever mounted upon the main frame adjacent the front end thereof, and a connecting rod pivoted to and extending between the hand lever and the angle lever.

3. An agricultural machine comprising a main frame, an axle structure including alined members journaled in the sides of the main frame, a ground wheel secured upon the outer end of each axle member, a clutch member fixed upon the inner end of one axle member, a mating clutch member slidably mounted upon the inner end of the other axle member and constrained to rotate therewith, a rocking arm pivoted at its front end upon the main frame and having a fork at its rear end engaged with the slidable clutch member, means for yieldably holding the clutch members in engagement, a hand lever mounted upon the main frame for rocking movement transverse thereto, and a link connecting the lower end of said lever with the rocking arm.

4. An agricultural machine comprising a main frame, plates secured to and depending from the rear end of the frame and having vertically extending slots forming closed rests at their lower ends, cultivators comprising beams pivoted at their front ends upon the sides of the main frame and extending through the slots in said depending plates to be guided thereby and be supported by the lower ends thereof, a rock shaft mounted upon the main frame, cranks extending rearwardly from the rock shaft, links connecting said cranks with the respective cultivators, and means on the main frame for rocking the shaft.

5. An agricultural machine comprising a main frame, a plurality of working elements carried by the frame, a fulcrum rod fixed upon the frame adjacent the front end thereof, hand levers mounted upon said fulcrum rod to rock about the same, spacers fitted upon the fulcrum rod between the levers, and connections between the respective levers and the working elements.

In testimony whereof I affix my signature.

JOEL M. TAYLOR. [L. S.]